US010876929B2

(12) United States Patent
Ochiai et al.

(10) Patent No.: US 10,876,929 B2
(45) Date of Patent: Dec. 29, 2020

(54) EXHAUST GAS ANALYSIS DEVICE, EXHAUST GAS ANALYSIS METHOD AND STORAGE MEDIUM RECORDING PROGRAMS FOR EXHAUST GAS ANALYSIS DEVICE

(71) Applicant: HORIBA, Ltd., Kyoto (JP)

(72) Inventors: Ryota Ochiai, Kyoto (JP); Tomoshi Yoshimura, Kyoto (JP)

(73) Assignee: HORIBA, LTD., Kyoto (JP)

( * ) Notice: Subject to any disclaimer, the term of this patent is extended or adjusted under 35 U.S.C. 154(b) by 186 days.

(21) Appl. No.: 16/053,145

(22) Filed: Aug. 2, 2018

(65) Prior Publication Data

US 2019/0064035 A1  Feb. 28, 2019

(30) Foreign Application Priority Data

Aug. 31, 2017 (JP) .................................. 2017-167975
Sep. 1, 2017 (JP) .................................. 2017-168234

(51) Int. Cl.
G01M 15/10 (2006.01)
G01N 1/22 (2006.01)

(52) U.S. Cl.
CPC ........ *G01M 15/104* (2013.01); *G01N 1/2252* (2013.01); *G01N 2001/2255* (2013.01)

(58) Field of Classification Search
CPC ............. G01M 15/104; G01M 15/102; G01M 15/108; G01N 1/2252; G01N 2001/2255; G01N 15/06; G01N 33/0004
See application file for complete search history.

(56) References Cited

U.S. PATENT DOCUMENTS 5,569,838 A 10/1996 Broedel et al.
5,968,452 A 10/1999 Silvis
(Continued)

FOREIGN PATENT DOCUMENTS

JP 53-045155 B 12/1978
JP 07-306127 A 11/1995
(Continued)

OTHER PUBLICATIONS

EESR dated Feb. 13, 2019 issued for European Patent Application No. 18 187 893.5, 10 pgs.
(Continued)

*Primary Examiner* — Freddie Kirkland, III
(74) *Attorney, Agent, or Firm* — Brooks Kushman P.C.

(57) ABSTRACT

The present claimed invention provides an exhaust gas analysis system using a dilution sampling method with an exhaust gas analysis device that can calculate a measured value such as a concentration of a component to be measured in an exhaust gas with higher accuracy. The exhaust gas analysis device analyzes a diluted exhaust gas, and comprises an analyzing part that measures a component to be measured in the diluted exhaust gas, an introducing path that introduces the diluted exhaust gas into the analyzing part and that has a resistance part, a viscous component concentration determining part that determines a concentration of a viscous component that is in the diluted exhaust gas and that is different from the component to be measured, and a correction part that corrects the measured value measured by the analyzing part in accordance with the concentration of the viscous component.

12 Claims, 5 Drawing Sheets

(56) References Cited

U.S. PATENT DOCUMENTS

| | | | | |
|---|---|---|---|---|
| 6,085,582 | A * | 7/2000 | Tripathi | G01M 15/102 73/114.71 |
| 6,112,574 | A * | 9/2000 | Hirano | G01M 15/104 73/23.31 |
| 6,200,819 | B1 * | 3/2001 | Harvey | G01N 1/2252 422/83 |
| 6,387,706 | B1 | 5/2002 | Eden | |
| 6,505,524 | B1 * | 1/2003 | Silvis | G01N 1/2252 73/863.03 |
| 6,823,268 | B2 * | 11/2004 | Silvis | G01F 25/0053 702/30 |
| 7,555,928 | B2 * | 7/2009 | Silvis | G01F 1/36 73/1.26 |
| 7,574,307 | B2 * | 8/2009 | Silvis | G01F 25/0053 702/30 |
| 9,410,872 | B2 * | 8/2016 | Yoshimura | G01F 9/00 |
| 9,568,396 | B2 * | 2/2017 | Miyai | G01M 15/108 |
| 2002/0026822 | A1 | 3/2002 | Reading et al. | |
| 2006/0236752 | A1 | 10/2006 | Nakamura | |
| 2011/0117000 | A1 | 5/2011 | Nakatani et al. | |
| 2014/0250976 | A1 | 9/2014 | Miyai | |
| 2015/0316447 | A1 | 11/2015 | Kumagai et al. | |

FOREIGN PATENT DOCUMENTS

| | | |
|---|---|---|
| JP | 2000-314684 A | 11/2000 |
| JP | 2006-275801 A | 10/2006 |
| JP | 2014-174054 A | 9/2014 |

OTHER PUBLICATIONS

Office Action dated Nov. 5, 2020 issued for Japanese Patent Application No. 2017-168234, 6 pgs.

* cited by examiner

| O₂ CONCENTRATION [vol%] | NOx CONCENTRATION BEFORE O₂ CORRECTION | | NOx CONCENTRATION AFTER O₂ CORRECTION | |
|---|---|---|---|---|
| | CONCENTRATION [ppm] | ERROR [%] | CONCENTRATION [ppm] | ERROR [%] |
| 0 | 310.89 | 0.00 | 310.89 | 0.00 |
| 5 | 308.40 | −0.80 | 310.67 | −0.07 |
| 10 | 306.09 | −1.54 | 310.58 | −0.10 |
| 15 | 304.43 | −2.08 | 311.14 | 0.08 |
| 20 | 302.12 | −2.82 | 310.99 | 0.03 |

FIG. 4

EXHAUST GAS ANALYSIS DEVICE, EXHAUST GAS ANALYSIS METHOD AND STORAGE MEDIUM RECORDING PROGRAMS FOR EXHAUST GAS ANALYSIS DEVICE

CROSS-REFERENCE TO RELATED APPLICATIONS

This application claims priority to Japanese Application No. 2017-167975, filed Aug. 31, 2017, and Japanese Application No. 2017-168234, filed Sep. 1, 2017, the disclosures of which are incorporated in their entirety by reference herein.

FIELD OF THE ART

This invention relates to an exhaust gas analysis device, an exhaust gas analysis method and a storage medium recording programs for an exhaust gas analysis device

BACKGROUND ART

As this kind of the exhaust gas analysis device known is, as shown in the patent document 1, an exhaust gas analysis device that samples all amount of the exhaust gas discharged from an internal combustion engine, produces a mixed gas (hereinafter also called as a diluted exhaust gas) as being a mixture of the exhaust gas and a dilution gas such as atmosphere and is used with a constant volume sampling (CVS) mechanism to make a flow rate of the diluted exhaust gas constant.

In accordance with the above-mentioned CVS mechanism, it is possible to reduce a concentration of moisture contained in the mixed gas by diluting the exhaust gas discharged from the internal combustion engine. As this result, dew condensation becomes difficult to occur so that it is possible to restrain a measurement error due to change of the gas concentration resulting from condensation of water or due to melting loss of a water-soluble component.

However, in accordance with the exhaust gas analysis system using the dilution sampling method to dilute the sampled exhaust gas with atmosphere, a concentration value (more concretely, a value obtained by converting a concentration value of the diluted exhaust gas calculated by the exhaust gas analysis device into a concentration value of the exhaust gas prior to dilution) of the component to be measured in the exhaust gas calculated by an exhaust gas analysis device may be lower than a concentration value of the component to be measured in the exhaust gas calculated by a direct sampling method wherein the sampled exhaust gas is not diluted (more specifically, a measurement error occurs).

This kind of a problem may occur also in case that a particle mass or a particle number of a component to be measured is calculated by the use of the exhaust gas analysis system using the dilution sampling method.

RELATED ART

Patent Document

Patent document 1: Japanese Unexamined Patent Application Publication No. 2014-174054

Problems to be Solved

The present disclosure intends to solve the problems and a main object of this invention is to provide an exhaust gas analysis device for the exhaust gas analysis system using a dilution sampling method that can calculate the measured value such as the concentration of the component to be measured in the exhaust gas with higher accuracy.

In order to solve the above-mentioned problem, the present claimed inventors focused on a point that the viscosity of a fluid to be measured (more specifically, a diluted exhaust gas) introduced into an analyzing part of the exhaust gas analysis device changes when the exhaust gas is diluted with atmosphere.

The exhaust gas analysis device is usually provided with a fluid resistor part such as a capillary on an introducing path through which the diluted exhaust gas is introduced into the analyzing part so as to limit a flow rate of the diluted exhaust gas that is introduced into the analyzing part where a concentration of a component is measured to a flow rate that is necessary for the measurement. In accordance with the exhaust gas analysis system using the dilution sampling method, a component whose viscosity is high such as oxygen contained in the atmosphere is mixed with the exhaust gas by diluting the exhaust gas with atmosphere and the viscosity of the diluted exhaust gas becomes higher than the viscosity of the fluid (namely, the exhaust gas) prior to dilution.

As a result of intensive studies by the inventors, the inventors found that the influence of a rise in the viscosity of the diluted exhaust gas on the measurement result of the analyzing part becomes remarkable in case that the diluted exhaust gas passes the fluid resistor part of the introducing path, and this becomes a cause of the measurement error for the analyzing part. More specifically, the inventors found that the fluid resistance that the diluted exhaust gas receives from the fluid resistor part such as the capillary increases and the flow rate of the diluted exhaust gas that is introduced into the analyzing part decreases when the viscosity of the diluted exhaust gas becomes higher so that the sensitivity of the analyzing part decreases, resulting in decrease of the measured value of the component to be measured. For example, although the measured value of the component to be measured in the diluted exhaust gas relative to the previously determined introducing amount is previously corrected in the analyzing part, there is a gap between the calculated measured value and the actual value because the introducing amount of the diluted exhaust gas changes.

As a result of further intensive studies by the inventors, the inventors found that there is a correlation between the variation of the measured value measured in the analyzing part and the viscosity of the diluted exhaust gas, and furthermore there is a correlation between the viscosity of the diluted exhaust gas and a concentration of a viscous component such as oxygen contained in the diluted exhaust gas. Then the inventors found that if the concentration of the viscous component in the diluted exhaust gas is grasped, an influence of the increased viscosity of the diluted exhaust gas on the measurement by the analyzing part, namely a drop amount of the measured value measured by the analyzing part can be calculated so that it is possible to correct the measured value of the component measured by the analyzing part. This led to the exhaust gas analysis device of this invention.

Means to Solve the Problems

More specifically, the exhaust gas analysis device in accordance with this invention is an exhaust gas analysis device that analyzes a diluted exhaust gas as being a mixture of an exhaust gas and a dilution gas that dilutes the exhaust gas, and is characterized by comprising an analyzing part that measures a component to be measured in the diluted exhaust gas, an introducing path that introduces the diluted exhaust gas into the analyzing part and that has a resistance part as being a flow resistance of the diluted exhaust gas, a viscous component concentration determining part that determines a concentration of a viscous component that is in the diluted exhaust gas and that is different from the component to be measured, and a correction part that corrects the measured value measured by the analyzing part in accordance with the concentration of the viscous component determined by the viscous component concentration determining part.

In accordance with this arrangement, since the measured value of the component measured by the analyzing part is corrected in accordance with the concentration of the viscosity component that is different from a viscosity of the component to be measured contained in the diluted exhaust gas as being a fluid to be measured, it is possible to calculate the measured value of the component to be measured in the exhaust gas with high accuracy. More specifically, it is possible to reduce an influence generated by the change of the viscosity by diluting the exhaust gas on the measured value by correcting the measured value measured by the analyzing part in accordance with the concentration of the viscosity component.

The above-mentioned viscosity component (hereinafter just described as "viscosity component") that is different from the component to be measured in the diluted exhaust gas is concretely the component whose viscosity is higher than the viscosity of the component to be measured.

The influence on the measured value measured by the analyzing part appears conspicuously if the viscous component having a viscosity higher than that of the component to be measured is contained in the diluted exhaust gas. As a result of this, it is possible to reduce an influence on the measured value by the change of the viscosity due to dilution of the exhaust gas by correcting the measured value by the use of the concentration of the viscous component whose viscosity is higher than that of the component to be measured among viscous components contained in the diluted exhaust gas.

It is preferable that the viscous component is oxygen.

In case that atmosphere is used as the dilution gas, the viscous component whose viscosity is the highest contained in the dilution gas is oxygen. As a result of this, the influence on the measured value measured by the analyzing part resulting from mixture of oxygen is the biggest. Then it is possible to effectively reduce the influence on the measured value by the change of the viscosity due to dilution of the exhaust gas by correcting the measured value by the use of the concentration of oxygen in the diluted exhaust gas so that it is possible to calculate the measured value such as the concentration of the component to be measured in the exhaust gas with higher accuracy.

As an object to be measured by the analyzing part represented is a concentration, a mass or a particle number of the component to be measured. In this case, the correction part corrects either of the measured values of the concentration, the mass (particle mass) and the particle number of the component measured by the analyzing part.

It is preferable that the viscous component concentration determining part calculates the concentration of the viscous component in the diluted exhaust gas based on the concentration of the viscous component in the dilution gas and the dilution ratio of the diluted exhaust gas.

In accordance with this arrangement, since there is no need of providing the exhaust gas analysis device with a sensor such as a concentration meter to measure the concentration of the viscous component in the diluted exhaust gas, it is possible to reduce an initial installation cost and a maintenance cost of the concentration meter, resulting in contributing to cost reduction.

The dilution ratio that is used for calculating the concentration of the viscous component in the diluted exhaust gas may be calculated based on a ratio of a theoretical $CO_2$ concentration in the exhaust gas discharged from an internal combustion engine to a total concentration of measured carbon components in the diluted exhaust gas.

The theoretical $CO_2$ concentration is a $CO_2$ concentration calculated assuming that a fuel burns in the theoretical air fuel ratio and is determined by an average composition of the fuel. The total concentration of the carbon components in the diluted exhaust gas is a total concentration of the components such as $CO_2$ produced due to complete combustion, CO produced due to incomplete combustion and/or THC.

In accordance with this arrangement, since the theoretical $CO_2$ concentration is previously determined based on the composition of the fuel, it is possible to calculate the dilution ratio only based on the measurement of the concentration of carbon components such $CO_2$, CO and/or THC in the diluted exhaust gas.

It is preferable that a part or all of the diluted exhaust gas is housed in a gas sampling bag that can house a gas, and the viscous component concentration determining part calculates the dilution ratio by the use of the total concentration of the carbon components in the diluted exhaust gas housed in the gas sampling bag.

Since the diluted exhaust gas housed in the gas sampling bag is in a state wherein the exhaust gas and the dilution gas are fully mixed, the concentration of each carbon component in the diluted exhaust gas is averaged. Then it is possible to calculate the dilution ratio more accurately by using the averaged concentration of each carbon component so that the concentration of the viscous component in the diluted exhaust gas can be calculated with higher accuracy. As a result of this, it is possible to calculate the measured value such as the concentration of the component to be measured in the exhaust gas with higher accuracy.

The dilution ratio of the diluted exhaust gas used for calculation of the concentration of the viscous component in the diluted exhaust gas may be calculated based on a ratio of a flow rate of the diluted exhaust gas to a flow rate of the exhaust gas.

The exhaust gas analysis device in accordance with this invention may further comprise a concentration sensor to measure the concentration of the viscous component and the viscous component determining part may obtain a concentration measured by the concentration sensor.

In addition, an exhaust gas analysis method in accordance with this invention is an exhaust gas analysis method to analyze a diluted exhaust gas as being a mixture of an exhaust gas and a dilution gas that dilutes the exhaust gas, and is characterized by comprising an analyzing step to measure a component to be measured in the diluted exhaust gas introduced through an introducing path having a flow resistance, a viscous component concentration determining step to determine a concentration of a viscous component that is in the diluted exhaust gas and that is different from the component to be measured, and a correction step to correct a measured value measured in the analyzing step in accordance with the concentration of the viscous component determined by the viscous component concentration determining step.

In addition, programs for exhaust gas analysis device stored in a storage medium in accordance with this invention are programs that analyze a diluted exhaust gas as being a mixture of an exhaust gas and a dilution gas that dilutes the exhaust gas, and are characterized by providing a computer with a function as an analyzing part that measures a component to be measured in the diluted exhaust gas introduced through an introducing path having a flow resistance, a function as a viscous component concentration determining part that determines a concentration of a viscous component that is in the diluted exhaust gas and that is different from the component to be measured, and a function as a correction part that corrects the measured value measured in the analyzing part in accordance with the concentration of the viscous component determined by the viscous component concentration determining part.

In accordance with the exhaust gas analysis method or the storage medium that stores programs for the exhaust gas analysis device, the same effect can be produced as that of the above-mentioned exhaust gas analysis device.

Effect

In accordance with the embodiments of the present invention, for the exhaust gas analysis system using a dilution sampling method it becomes possible to provide the exhaust gas analysis device that can calculate the measured value such as the concentration of the component to be measured in the exhaust gas with higher accuracy.

BRIEF DESCRIPTION OF THE DRAWINGS

FIG. 4 is a chart to compare an $NO_x$ concentration calculated by the use of the exhaust gas analysis device in this embodiment with an $NO_x$ concentration calculated by the use of the exhaust gas analysis device of a conventional type.

DETAIL DESCRIPTION

One embodiment of an exhaust gas analysis system comprising an exhaust gas analysis device in accordance with this invention will be explained with reference to drawings.

The exhaust gas analysis system 100 of this embodiment is used for measuring a concentration of a component to be measured in an exhaust gas discharged from an internal combustion engine such as, for example, an engine.

Figure 1:
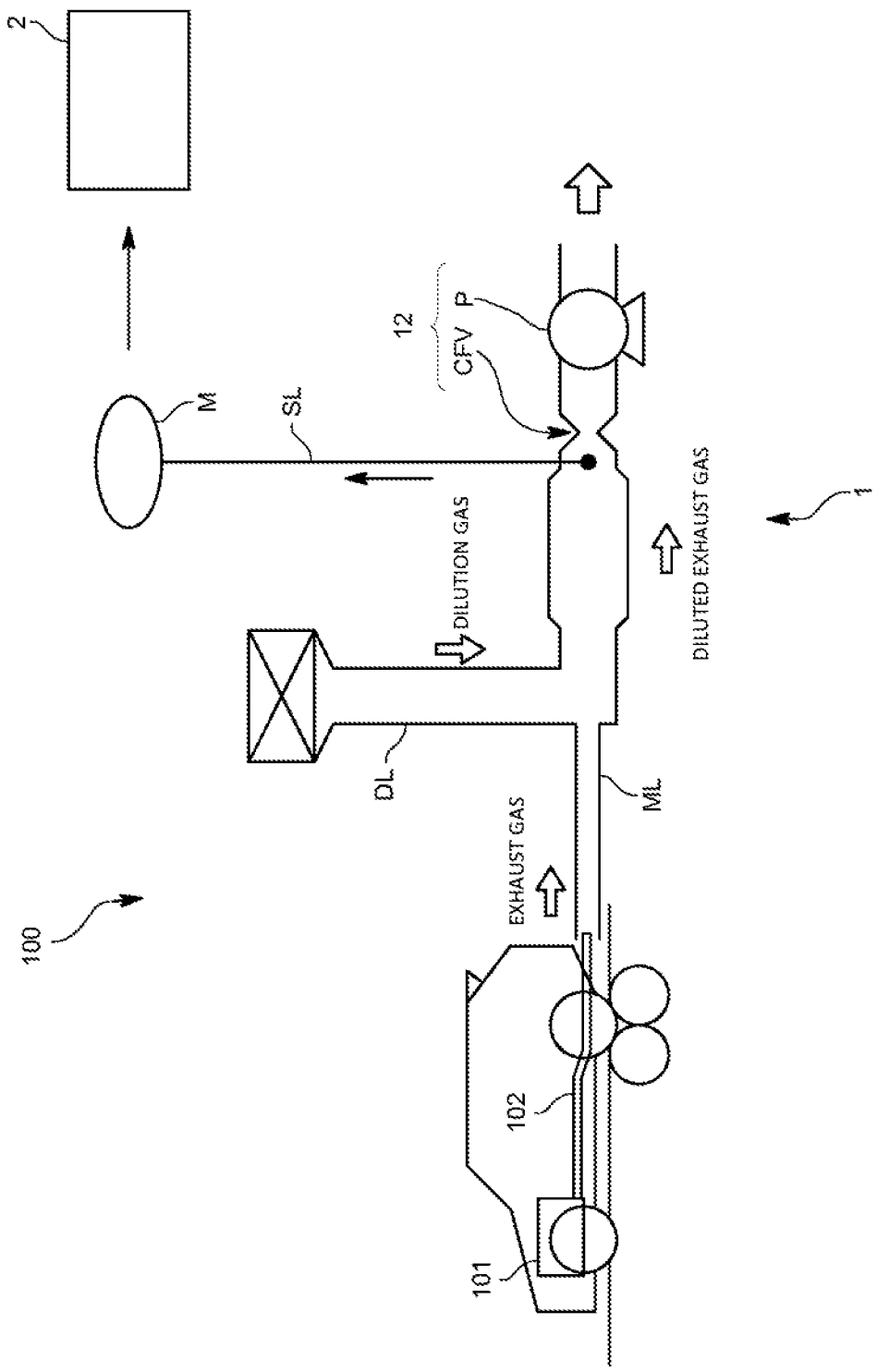
FIG. 1 is a pattern view of an exhaust gas analysis system in this embodiment.

Concretely, as shown in FIG. 1, the exhaust gas analysis system 100 measures the concentration to be measured in the exhaust gas discharged from the engine during a mode driving test (WLTP mode, JC08 mode or the like) of a vehicle conducted by using a chassis test device. More concretely, the exhaust gas analysis system 100 comprises a constant volume sampling (CVS) device 1 that samples all amount of the exhaust gas and that produces a diluted exhaust gas by mixing all amount of the sampled exhaust gas with a dilution gas so as to make a flow rate of the diluted exhaust gas constant, a diluted exhaust gas sampling bag (M) that houses the sampled diluted exhaust gas and an exhaust gas analysis device 2 that analyses the diluted exhaust gas housed in the diluted exhaust gas sampling bag (M) and measures a concentration of the component to be measured in the diluted exhaust gas and that calculates the concentration of the component to be measured in the exhaust gas base on the measured result.

The CVS device 1 comprises, as shown in FIG. 1, a main flow channel (ML) where the exhaust gas that is discharged from an exhaust pipe 102 of the internal combustion engine 101 flows, a dilution gas flow channel (DL) that joins the main flow channel (ML) and where a dilution gas that dilutes the exhaust gas flows, and a flow rate control part 12 that is arranged in a downstream side of a junction where the main flow channel (ML) and the dilution gas flow channel (DL) join and that controls the flow rate of the diluted exhaust gas diluted by the dilution gas.

The flow rate control part 12 is a critical flow rate venturi system comprises, as shown in FIG. 1, a critical flow rate venturi (CFV) and a suction pump (P). One critical flow rate venturi (CFV) is provided in this embodiment, however, a plurality of critical flow rate venturis may be arranged in parallel and the critical flow rate venturi (CFV) through which the diluted exhaust gas flows is changed by using, for example, an open/close valve so that the flow rate of the diluted exhaust gas can be changed.

The above-mentioned CVS device 1 houses a part of the diluted exhaust gas in the diluted exhaust gas sampling bag (M) through the diluted exhaust gas sampling flow channel (SL) in a state wherein a total flow rate of the exhaust gas and the dilution gas, namely the flow rate of the diluted exhaust gas is constant.

The diluted exhaust gas housed in the diluted exhaust gas sampling bag (M) is supplied to the exhaust gas analysis device 2 and the concentration of the component to be measured in the exhaust gas is calculated by the exhaust gas analysis device 2.

Figure 2:
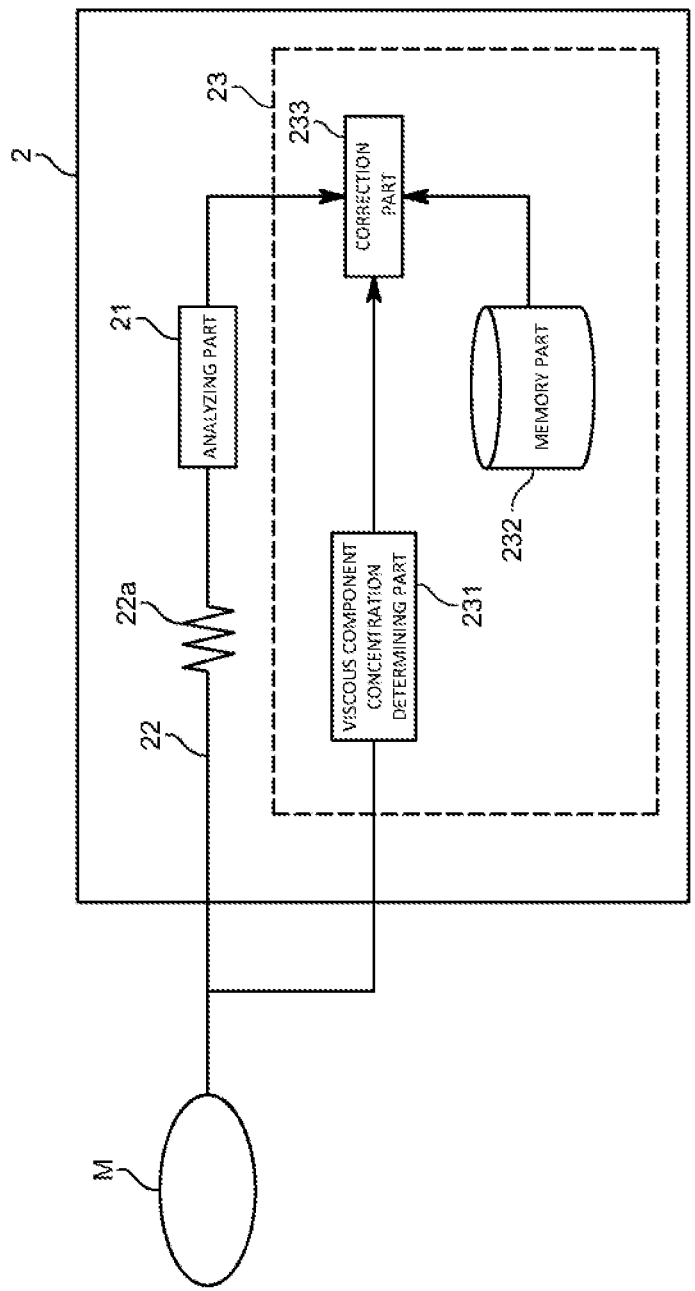
FIG. 2 is a function block diagram showing functions of an exhaust gas analysis device of this embodiment.

The exhaust gas analysis device 2 comprises, as shown in FIG. 2, an analyzing part 21 that measures the concentration of the component to be measured in the diluted exhaust gas supplied by the diluted exhaust gas sampling bag (M), an introducing path 22 through which the diluted exhaust gas is introduced to the analyzing part 21 and an arithmetic unit 23 that corrects the concentration value output by the analyzing part 21 in accordance with a concentration of a viscous component that is different from the component to be measured contained in the diluted exhaust gas.

In this embodiment, the component to be measured is $NO_x$ (NO and $NO_2$) and the viscous component that is different from the component to be measured contained in the diluted exhaust gas is oxygen ($O_2$).

The analyzing part 21 measures the concentration of $NO_x$ as being the component to be measured contained in the diluted exhaust gas, and concretely is a CLD type $NO_x$ meter.

Figure 3:
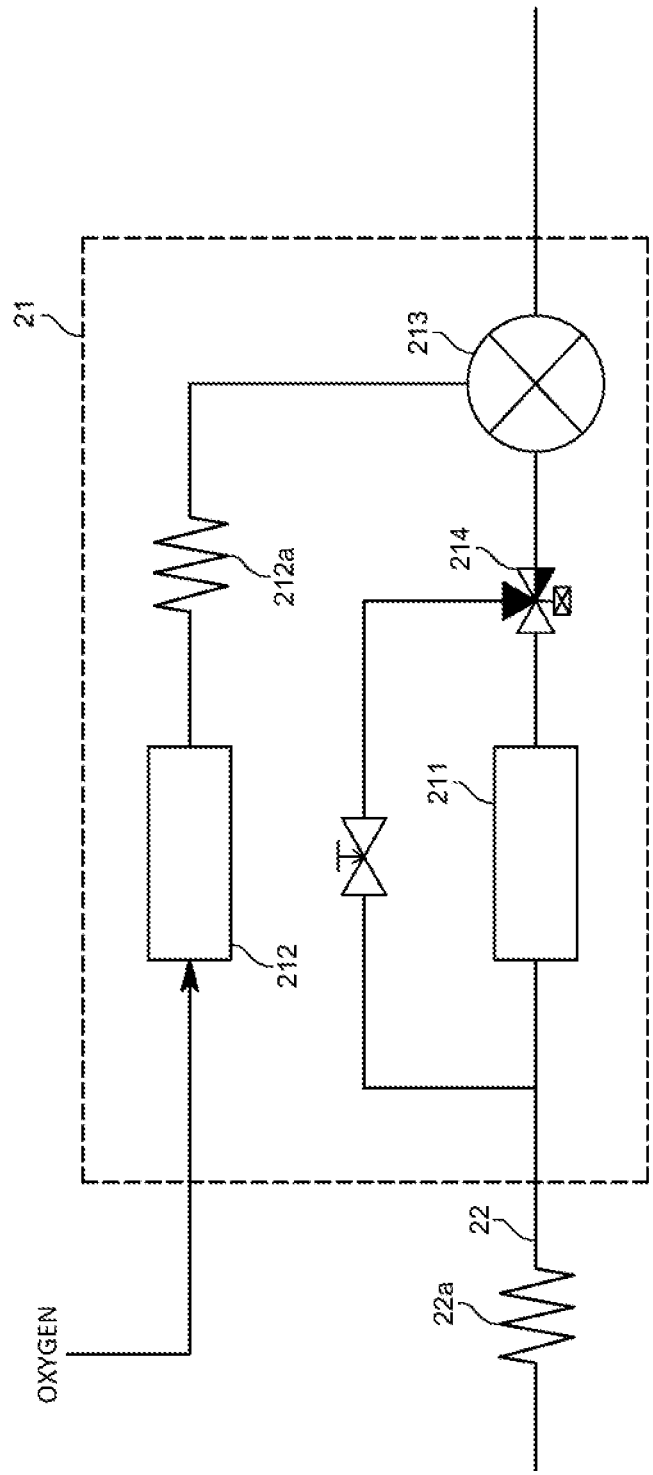
FIG. 3 is a pattern view of a configuration of an analysis part in this embodiment.

The CLD type $NO_x$ meter 21 can measure an amount (a concentration) of $NO_x$ in the diluted exhaust gas, and comprises, as shown in FIG. 3, an NO converter 211, an ozone generator 212 and a reaction vessel 213 containing a photo detector (not shown in drawings). The NO converter 211 converts $NO_x$ into NO, and is provided for one of a pair of the parallel paths that divide the diluted exhaust gas introduced through the introducing path 22 in two. An electromagnetic switch valve 214 is arranged in a terminal of the parallel paths so that the gas is introduced alternatively into the reaction vessel 213 only through either one of the paths. The ozone generator 212 converts oxygen supplied by an oxygen cylinder into ozone and outputs a specific quantity of an ozone-containing gas through a capillary 212a. The reaction vessel 213 is a vessel having a fixed volume, and has a sample gas introducing port, an ozone-containing gas introducing port and a discharging port. The gas from either one of the parallel paths selected by the switch valve 214 is introduced and the ozone-containing gas from the ozone generator 212 is introduced to the ozone-containing gas introducing port. Each gas is mixed in the reaction vessel 213 and emits light. The photo detector, not shown in drawings, measures an emission intensity in the reaction vessel 213, and uses a photo-multiplier as the photo detector in this embodiment.

The introducing path 21 introduces the measurement objective gas housed in the diluted exhaust gas sampling bag (M) into the analyzing part 21. A fluid resistor part 22a to be a flow resistance of the diluted exhaust gas is arranged in the introducing path 22, and the fluid resistor part 22a limits the flow rate of the diluted exhaust gas that is introduced into the analyzing part 21 to a flow rate that is necessary for measuring the concentration of $NO_x$. As the fluid resistor part 22a represented is a flow control member such as a capillary or an orifice that controls the flow rate by lessening the flow channel area in the introducing path 22.

The arithmetic unit 23 is an electric circuit comprising, for example, a CPU, a memory and an AD converter. In addition, the arithmetic unit 23 produces functions as a viscous component concentration determining part 231, a memory part 232 and a correction part 233 by cooperatively working the CPU and its peripheral devices based on the programs stored in the memory.

Each part will be explained in detail.

The viscous component concentration determining part 231 calculates an oxygen concentration ($[O_2]_{sam}$) in the diluted exhaust gas.

The oxygen concentration determining part 231 calculates the oxygen concentration ($[O_2]_{sam}$) in the diluted exhaust gas based on the oxygen concentration ($[O_2]_{amb}$) in the dilution gas and a dilution ratio (DF) of the diluted exhaust gas. More concretely, the oxygen concentration in the diluted exhaust gas is determined in accordance with the following expression (1). 20.95% as being the oxygen concentration in the atmosphere may be used as the oxygen concentration ($[O_2]_{amb}$) in the dilution gas, or the oxygen concentration in the atmosphere may be directly measured and the obtained oxygen concentration may be used.

$$[O_2]_{sam} = [O_2]_{amb} \times \left(1 - \frac{1}{DF}\right) \quad (1)$$

A principle to determine the oxygen concentration ($[O_2]_{sam}$) in the diluted exhaust gas by the above-mentioned expression (1) will be explained. Since the exhaust gas analysis system 100 in this embodiment samples and dilutes a total amount of the exhaust gas, the oxygen amount contained in the diluted exhaust gas equals to the sum of the oxygen amount contained in the exhaust gas and the oxygen amount contained in the dilution gas. More specifically, the product of the oxygen concentration ($[O_2]_{sam}$) in the diluted exhaust gas and an integrated value ($V_{mix}$) of the diluted exhaust gas flow rate equals to the sum of the product of the oxygen concentration ($[O_2]_{ex}$) in the dilution gas and an integrated value ($V_{ex}$) of the exhaust gas flow rate and the product of the oxygen concentration ($[O_2]_{amb}$) in the dilution gas and the integrated value ($V_{amb}$) of the dilution gas flow rate so that the following expression (2) becomes true.

$$[O_2]_{sam}V_{mix}=[O_2]_{ex}V_{ex}+[O_2]_{amb}V_{amb} \quad (2)$$

If the above-mentioned expression (2) is further converted, the following expression (3) will be introduced.

$$[O_2]_{sam} = \frac{[O_2]_{ex}V_{ex} + [O_2]_{amb}V_{amb}}{V_{mix}} \quad (3)$$

Since the oxygen concentration ($[O_2]_{ex}$) in the exhaust gas is extremely small compared with the oxygen concentration ($[O_2]_{amb}$) in the dilution gas, the product of the oxygen concentration ($[O_2]_{ex}$) in the exhaust gas and the integrated value ($V_{ex}$) of the exhaust gas flow rate becomes small in such a degree that can be ignored compared with the product of the oxygen concentration ($[O_2]_{amb}$) in the dilution gas and the integrated value ($V_{amb}$) of the dilution gas flow rate (more specifically, $[O_2]_{ex}V_{ex} \ll [O_2]_{amb}V_{amb}$). Then, the above-mentioned expression (3) can be further converted as follows.

$$[O_2]_{sam} = [O_2]_{amb} \frac{V_{amb}}{V_{mix}} \quad (1)$$
$$= [O_2]_{amb} \frac{V_{mix} - V_{ex}}{V_{mix}}$$
$$= [O_2]_{amb} \times \left(1 - \frac{1}{DF}\right)$$

As mentioned above, the above-mentioned expression (1) to determine the oxygen concentration ($[O_2]_{sam}$) in the diluted exhaust gas is developed.

In case of determining the oxygen concentration in the diluted exhaust gas by the use of the above-mentioned expression (1), similar to the following expression (4), the oxygen concentration determining part 231 calculates the dilution ratio (DF) as a ratio of the theoretical $CO_2$ concentration ($[CO_2]_{ideal}$) in the exhaust gas to the total concentration ($[CO_2]_{sam}+[CO]_{sam}+[THC]_{sam}$) of the carbon components ($CO_2$, CO, THC) in the diluted exhaust gas.

$$DF = \frac{[CO_2]_{ideal}}{[CO_2]_{sam} + [CO]_{sam} + [THC]_{sam}} \quad (4)$$

The theoretical $CO_2$ concentration is a $CO_2$ concentration that is calculated assuming that the fuel that burns in an internal combustion engine burns in the theoretical air fuel ratio. More specifically, in case that the fuel whose average composition is $C_xH_yO_z$ burns in the theoretical air fuel ratio, the reaction in accordance with the following reaction formula (a) occurs.

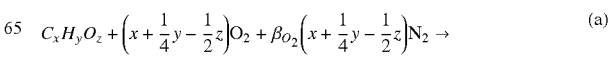

-continued

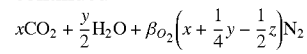

Accordingly, the theoretical $CO_2$ concentration ($[CO_2]_{ideal}$) can be calculated by the following expression (5).

$$[CO_2]_{ideal} = \frac{100}{1 + \frac{1}{2}HCR + \beta_{O_2}\left(1 + \frac{1}{4}HCR - \frac{1}{2}OCR\right)} \quad (5)$$

where, HCR is a ratio (y/x) of a hydrogen atom number to a carbon atom number in one mole of fuel, OCR is a ratio (z/x) of an oxygen atom number to a carbon atom number in one mole of fuel, and $\beta_{Os2}$ is a mole ratio (about 3.774) between the inert gas and oxygen in dry air. Since both of HCR and OCR are determined based on the average composition of the fuel, the theoretical $CO_2$ concentration is a value previously determined according to the fuel.

The exhaust gas analysis device 2 in this embodiment comprises a $CO_2$ meter, a CO meter and a THC meter (not shown in drawings) each of which measures the $CO_2$ concentration, the CO concentration and the THC concentration in the diluted exhaust gas in the diluted exhaust gas sampling bag (M) respectively. The viscous component concentration determining part 231 obtains the values measured by the above-mentioned $CO_2$ meter, the CO meter and the THC meter, and calculates the dilution ratio (DF) by the use of these measured values.

The memory part 232 is formed in a predetermined area of the memory, and stores $NO_x$ concentration correction data as being data associating the oxygen concentration ($[O_2]_{sam}$) in the diluted exhaust gas and a lowering rate of the $NO_x$ concentration measured by the analyzing part 21.

The correction part 233 corrects the concentration value of the $NO_x$ measured by the analyzing part 21 based on the oxygen concentration in the diluted exhaust gas determined by the viscous component concentration determining part 231 and the $NO_x$ concentration correction data stored in the analyzing part 21, and calculates the $NO_x$ concentration in the exhaust gas based on the corrected concentration value of $NO_x$. More concretely, the correction part 233 refers the $NO_x$ concentration correction data stored in the memory part 232 and determines the correction value (or the correction ratio) relative to the concentration value of $NO_x$ measured by the analyzing part 21. The $NO_x$ concentration value measured by the analyzing part 21 is corrected based on the determined correction value (or the correction ratio). Then the $NO_x$ concentration in the exhaust gas is calculated based on the corrected $NO_x$ concentration.

In accordance with the exhaust gas analysis device 2 of this embodiment having the above-mentioned arrangement, since the concentration value of $NO_x$ measured by the analyzing part 21 is corrected based on the oxygen concentration in the diluted exhaust gas, it is possible to calculate the concentration of $NO_x$ in the exhaust gas with high accuracy. More specifically, it is possible to reduce an influence on the concentration value of $NO_x$ by the change of the viscosity due to dilution of the exhaust gas by correcting the concentration value of $NO_x$ measured by the analyzing part 2 in accordance with the concentration of oxygen.

In addition, since the measured value by the analyzing part 21 is corrected based on the concentration of the oxygen among the viscous component contained in the diluted exhaust gas, it is possible to further reduce an influence on the concentration value of $NO_x$ due to the change of the viscosity resulting from diluting the exhaust gas so that the concentration of $NO_x$ in the exhaust gas can be calculated with higher accuracy.

In addition, since the viscous component concentration determining part 231 calculates the oxygen concentration in the diluted exhaust gas based on the oxygen concentration in the dilution gas and the dilution ratio (DF) of the diluted exhaust gas, there is no need of providing the exhaust gas analysis device 2 with a sensor such as an oxygen concentration meter to measure the oxygen concentration in the diluted exhaust gas. As a result of this, it is possible to reduce an initial installation cost or a maintenance cost of the concentration meter, resulting in contributing to cost reduction.

Furthermore, since the viscous component concentration determining part 231 calculates the dilution ratio (DF) by the use of the total concentration of the carbon components in the diluted exhaust gas housed in the diluted exhaust gas sampling bag (M), it is possible to calculate the dilution ratio (DF) with higher accuracy by the use of the concentration of each carbon component which is fully averaged. Accordingly, it is possible to calculate the oxygen concentration in the diluted exhaust gas more accurately. As this result, it is possible to calculate the $NO_x$ concentration in the exhaust gas with high accuracy.

Figure 5:
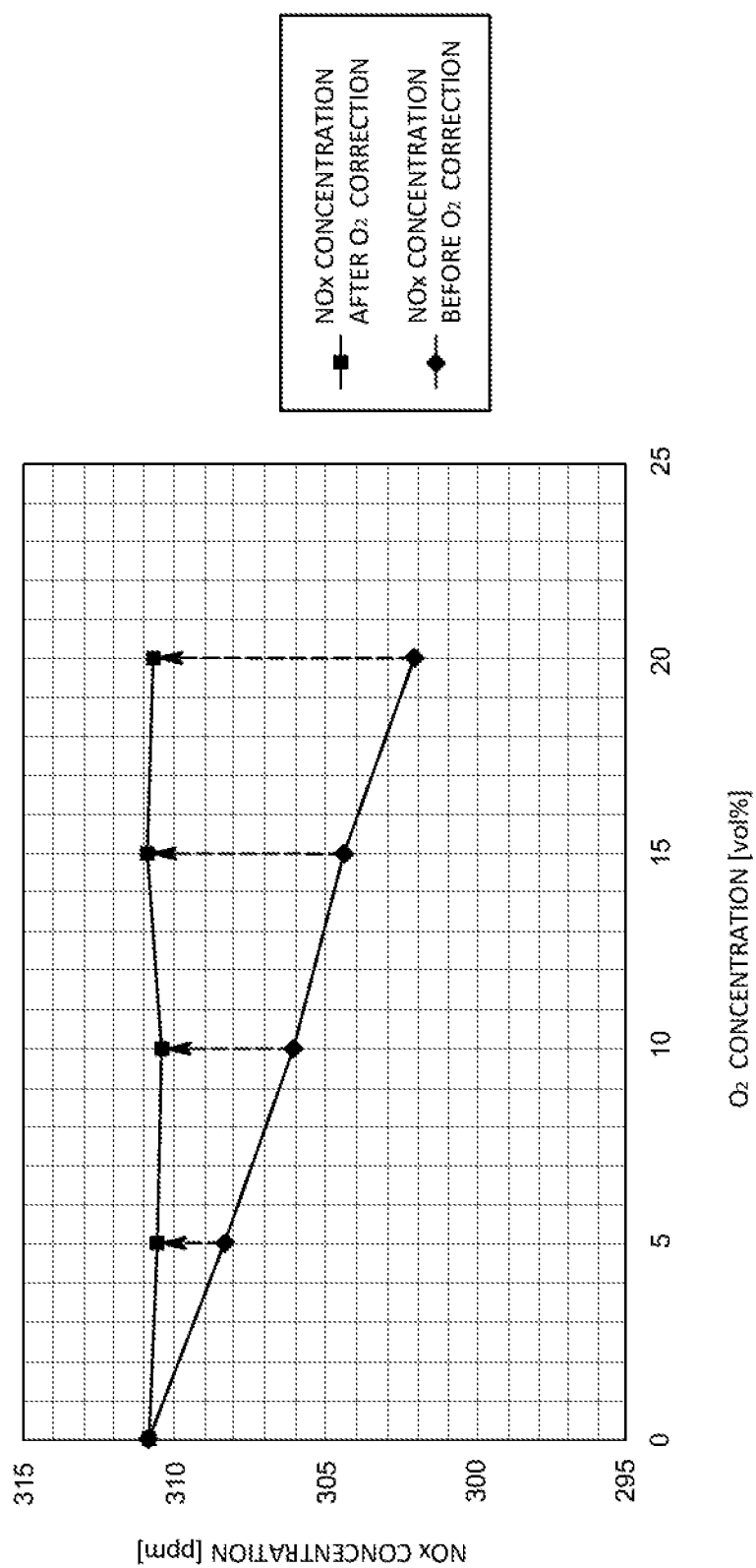
FIG. 5 is a graph to compare the $NO_x$ concentration calculated by the use of the exhaust gas analysis device in this embodiment with the $NO_x$ concentration calculated by the use of the exhaust gas analysis device of the conventional type.

FIG. 4 and FIG. 5 are a table and a graph showing that the measurement error of the concentration value of the component to be measured due to the change of the viscosity of the diluted exhaust gas can be reduced by the use of the exhaust gas analysis device 2 in this embodiment. More concretely, in a condition wherein the $NO_x$ concentration in the exhaust gas is set to be constant and the oxygen concentration in the diluted exhaust gas is changed, shown is the result of comparison between the $NO_x$ concentration value ($NO_x$ concentration value after $O_2$ correction) in the exhaust gas calculated by correcting the $NO_x$ concentration value in the diluted exhaust gas obtained by the CLD type $NO_x$ meter in accordance with the oxygen concentration by the use of the exhaust gas analysis device 2 and the $NO_x$ concentration value ($NO_x$ concentration value before $O_2$ correction) in the exhaust gas obtained by the use of the exhaust gas analysis device 2 under the same condition except that the $NO_x$ concentration value that is measured by the CLD type $NO_x$ meter is not corrected.

In case that the $NO_x$ concentration value measured by the CLD type $NO_x$ meter is not corrected in accordance with the oxygen concentration, a measurement error of the $NO_x$ concentration value in the exhaust gas becomes large as the oxygen concentration in the diluted exhaust gas increases. In case that the oxygen concentration in the diluted exhaust gas is 20%, about 3% error generates in the obtained $NO_x$ concentration value in the exhaust gas.

Meanwhile, in case that the $NO_x$ concentration value measured by the CLD type $NO_x$ meter by the use of the exhaust gas analysis device 2 of this embodiment is corrected according to the oxygen concentration, the measurement error of the $NO_x$ concentration value in the exhaust gas falls within 0.10% even though the oxygen concentration in the diluted exhaust gas increases.

According to these results, if the exhaust gas analysis device 2 in accordance with this embodiment is used for the exhaust gas analysis system using the dilution sampling type, it is possible to reduce the measurement error of the concentration value of the component to be measured resulting from the change of the viscosity of the diluted exhaust gas so that it becomes clear that the concentration value of the component to be measured in the exhaust gas can be calculated with higher accuracy.

Other Embodiment

This invention is not limited to the above-mentioned embodiment.

In the above-mentioned embodiment, the exhaust gas analysis system 100 measures the concentration of the component as the object to be measured in the exhaust gas, however, the object to be measured is not limited to this. In the other embodiment, the exhaust gas analysis system 100 may measure a mass or a number of particles of the component to be measured in the exhaust gas.

In case that the exhaust gas analysis system 100 measures the number of the particles of the component to be measured in the exhaust gas, the analyzing part 21 may be a solid particle number measuring device (SPCS) using a laser scattering type condensation particle counter (CPC). In case that the exhaust gas analysis system 100 measures the mass of the component to be measured in the exhaust gas, the analyzing part 21 may be a PM collection filter as being a PM measuring device to collect particulate matters (PM) contained in the diluted exhaust gas. In addition, the analyzing part 21 may be other measuring device that can make a measurement by the use of the diluted exhaust gas. Furthermore, the exhaust gas analysis system 100 may measure the mass of the discharged component based on the product of the concentration value of the calculated component to be measured in the exhaust gas and the flow rate of the exhaust gas.

In the above-mentioned embodiment, the viscous component concentration determining part 231 calculates the dilution ratio by the ratio of the theoretical $CO_2$ concentration in the exhaust gas to the total concentration of the obtained carbon components in the diluted exhaust gas, however, it is not limited to this. In the other embodiment, the dilution ratio may be calculated as a ratio (a volume ratio) of the integrated value $V_{mix}$ (a volume of the diluted exhaust gas) of the diluted exhaust gas flow rate to the integrated value $V_{ex}$ (a volume of the exhaust gas) of the exhaust gas flow rate. The above-mentioned CVS device 1 is so controlled that the flow rate of the diluted exhaust gas becomes constant, namely the total flow rate of the exhaust gas flow rate and the dilution gas flow rate becomes constant. As this result, the integrated value $V_{ex}$ of the exhaust gas flow rate can be calculated by measuring the integrated value $V_{mix}$ of the diluted exhaust gas flow rate and the integrated value $V_{amb}$ (a volume of the dilution gas) of the dilution gas flow rate, and the dilution ratio can be calculated by the use of the integrated value $V_{ex}$ of the exhaust gas flow rate.

In the above-mentioned embodiment, the viscous component concentration determining part 231 calculates the concentration of the viscous component in the diluted exhaust gas based on the concentration of the oxygen component in the dilution gas and the dilution ratio of the diluted exhaust gas, however, it is not limited to this. In the other embodiment, the exhaust gas analysis device 2 may further comprise an oxygen concentration meter such as a zirconia type oxygen sensor that measures the oxygen concentration in the diluted exhaust gas, and the viscous component concentration determining part 231 may obtain the oxygen concentration measured by the oxygen concentration meter.

In the above-mentioned embodiment, the analyzing part 21 is the CLD type $NO_x$ meter, however, a detector using other principle such as an NDIR method detector, an FID method detector, an FTIR method detector and a QCL-IR method detector may be used.

In the above-mentioned embodiment, the component to be measured is $NO_x$ or the particles, however, it is not limited to this, and a carbon compound such $CO$, $CO_2$, $HC$ and $THC$ or the like or a sulfur compound such as $SO_2$, and $H_2S$ or the like may be the object to be measured.

In the above-mentioned embodiment, the viscous component concentration determining part 231 calculates the dilution ratio (DF) by the use of the total concentration of the carbon components in the diluted exhaust gas housed in the diluted exhaust gas sampling bag (M), however, it is not limited to this. In the other embodiment, a sampling line that samples the diluted exhaust gas may be arranged in a downstream side of a point where the mail flow channel (ML) of the CVS device 1 and the dilution gas flow channel (DL) converge and a concentration meter that can continuously measure the concentration of the carbon component in the diluted exhaust gas may be connected to the sampling line. In accordance with this embodiment, the viscous component concentration determining part 231 may calculate the dilution ratio (DF) by the use of the concentration value that is continuously measured by the concentration meter connected to the sampling line.

In the above-mentioned embodiment, the concentration of the component to be measured is corrected in accordance with the oxygen concentration while the viscous component that is different from the component to be measured in the diluted exhaust gas is set as oxygen, however, it is not limited to this. In the other embodiment, the concentration of the component to be measured may be corrected by the use of a concentration of a component that is contained in the dilution gas and that is a viscous component other than oxygen whose viscosity is higher than that of the component to be measured.

The exhaust gas analysis system 100 in accordance with other embodiment may comprise a dilution gas sampling bag that samples and houses the dilution gas. The exhaust gas analysis device 2 may calculate the $NO_x$ amount contained in the exhaust gas by means of a background correction by subtracting the measured $NO_x$ concentration of the dilution gas housed in the dilution gas sampling bag from the $NO_x$ concentration in the diluted exhaust gas housed in the diluted exhaust gas sampling bag. In this case, the arithmetic device 23 may correct the concentration value output by the analyzing part 21 in accordance with the concentration of the viscous component (oxygen) that is different from the component ($NO_x$) to be measured contained in the dilution gas. The arrangement to correct the concentration value of the component to be measured contained in the dilution gas is the same as the arrangement to correct the concentration value of the component to be measured contained in the above-mentioned diluted exhaust gas.

In the above-mentioned embodiment, the exhaust gas analysis system 100 samples all amount of the exhaust gas and dilutes it, however, it is not limited to this. In the other embodiment, a part of the exhaust gas may be sampled and diluted.

In the above-mentioned embodiment, the exhaust gas analysis system 100 measures the component to be measured in the exhaust gas discharged in the test using the chassis test device, however, it is not limited to this. In the other embodiment, the component to be measured in the exhaust gas discharged in a test using a driving test device such as an engine test device or a power train may be measured.

In the above-mentioned embodiment, the viscous component that is different from the component to be measured is the component whose viscosity is higher than the viscosity of the component to be measured, however, it is not limited to this. In the other embodiment, the viscosity of the viscous component that is different from the component to be measured may be higher than the viscosity of the exhaust gas. In accordance with this, the effect of the above-mentioned invention can be also obtained.

In the above-mentioned embodiment, the gas analysis system 100 measures the component to be measured in the exhaust gas discharged from the internal combustion engine such as the engine, however, it is not limited to this. In the other embodiment, the component to be measured in the exhaust gas discharged from an external combustion engine such as a thermal power station or a factory may be measured.

In addition, it is a matter of course that the present claimed invention is not limited to the above-mentioned embodiment and may be variously modified without departing from a spirit of the invention.

EXPLANATION OF REFERENCE NUMERALS

100 . . . exhaust gas analysis system
1 . . . CVS device
2 . . . exhaust gas analysis device
21 . . . analyzing part (CLD type $NO_x$ meter)
22 . . . introducing path
22a . . . fluid resistor part
231 . . . viscous component concentration determining part
233 . . . correction part

The invention claimed is:

1. An exhaust gas analysis device that analyzes a diluted exhaust gas, wherein the diluted exhaust gas is a mixture of an exhaust gas and a dilution gas that dilutes the exhaust gas, the exhaust gas analysis device comprising:
    an analyzing part that measures a component to be measured in the diluted exhaust gas,
    an introducing path that introduces the diluted exhaust gas into the analyzing part and that has a flow control member provided in the introducing, path, wherein the flow control member reduces a flow rate of the diluted exhaust gas in the introducing path,
    a viscous component concentration determining part that determines a concentration of a viscous component that is in the diluted exhaust gas and that is different from the component to be measured, wherein the viscous component is oxygen, and
    a correction part that corrects a value measured by the analyzing part in accordance with the concentration of the viscous component determined by the viscous component concentration determining part.

2. The exhaust gas analysis device described in claim 1, wherein
    a viscosity of the viscous component is higher than the viscosity of the component to be measured.

3. The exhaust gas analysis device described in claim 1, wherein
    the analyzing part measures a concentration, a mass, or a particle number of the component to be measured, and
    the correction part corrects either of the measured values of the concentration, the mass, and the particle number of the component measured by the analyzing part.

4. The exhaust gas analysis device described in claim 1, wherein
    the viscous component concentration determining part calculates the concentration of the viscous component in the diluted exhaust gas based on a concentration of the viscous component in the dilution gas and a dilution ratio of the diluted exhaust gas.

5. The exhaust gas analysis device described in claim 4, wherein
    the exhaust gas is a gas discharged from an internal combustion engine, and
    the dilution ratio is calculated based on a ratio of a theoretical CO2 concentration in the exhaust gas to a total concentration of measured carbon components in the diluted exhaust gas.

6. The exhaust gas analysis device described in claim 5, wherein
    a part or all of the diluted exhaust gas is housed in a gas sampling bag that can house a gas, and
    the viscous component concentration determining part calculates the dilution ratio by use of the total concentration of the measured carbon components in the diluted exhaust gas housed in the gas sampling bag.

7. The exhaust gas analysis device described in claim 4, wherein
    the exhaust gas is a gas discharged from an internal combustion engine, and
    the dilution ratio is calculated based on a ratio of the flow rate of the diluted exhaust gas to a flow rate of the exhaust gas.

8. The exhaust gas analysis device described in claim 1 further comprising a concentration sensor to measure the concentration of the viscous component, wherein the viscous component determining part obtains a concentration measured by the concentration sensor.

9. An exhaust gas analysis method that analyze a diluted exhaust gas as being a mixture of an exhaust gas and a dilution gas that dilutes the exhaust gas, the method comprising:
    measuring a component to be measured in the diluted exhaust gas introduced through an introducing path,
    passing the diluted exhaust gas in the introducing path through a flow control member to reduce a flow rate of the diluded exhaust gas,
    determining a concentration of a viscous component that is in the diluted exhaust gas and that is different from the component to be measured, wherein the viscous component is oxygen, and
    correcting a value obtained via the measuring in accordance with the concentration of the viscous component.

10. A computer readable storage medium having instructions stored thereon that, when executed by an exhaust gas analysis device that analyzes a diluted exhaust gas as being a mixture of an exhaust gas and a dilution gas that dilutes the exhaust gas, causes the exhaust gas analysis device to perform operations of
    measuring a component to be measured in the diluted exhaust gas introduced through an introducing path,
    passing the diluted exhaust gas in the introducing path through a flow control member to reduce the flow rate of the diluded exhaust gas,
    determining a concentration of a viscous component that is in the diluted exhaust gas and that is different from the component to be measured, wherein the viscous component is oxygen, and correcting a value obtained via the measuring in accordance with the concentration of the viscous component determined by the viscous component concentration determining part.

11. The exhaust gas analysis device described in claim 1 wherein the flow control. member is a capillary.

12. The exhaust gas analysis device described in claim 1, wherein the flow control member is an orifice.

* * * * *